United States Patent [19]

Young

[11] 4,268,092

[45] May 19, 1981

[54] HYDRAULIC BRAKING SYSTEMS

[75] Inventor: Alastair J. Young, Kenilworth, England

[73] Assignee: Automotive Products Limited, Warwickshire, England

[21] Appl. No.: 42,555

[22] Filed: May 25, 1979

[30] Foreign Application Priority Data

May 31, 1978 [GB] United Kingdom ............ 25730/78

[51] Int. Cl.³ .............................................. B60T 8/22
[52] U.S. Cl. .................................................. 303/22 R
[58] Field of Search ............ 188/195; 303/6 C, 22 A, 303/22 R, 23 A, 23 R

[56] References Cited

U.S. PATENT DOCUMENTS 2,490,641 12/1949 Du Rostu ............................ 188/195
4,143,924 3/1979 Coupland ........................ 188/195 X Primary Examiner—Duane A. Reger
Attorney, Agent, or Firm—Kemon & Estabrook

[57] ABSTRACT

A pressure regulator for a vehicle braking system through which fluid under pressure is supplied to actuate wheel brakes and which includes means to limit brake pressure to a proportion of applied pressure dependent on a variable ratio lever system whose ratio depends on the load of the vehicle.

Up to a given applied pressure the rate of increase of brake pressure is dependent on the ratio of the lever system, above that pressure the rate of increase of brake pressure is reduced dependent on the ratio of the lever system. However, where the rate of increase of brake pressure is equal to the rate of increase of applied pressure at the given applied pressure, the subsequent rate of increase of brake pressure is reduced dependent on the ratio of the lever system at a further given applied pressure dependent on the ratio of the lever system.

7 Claims, 6 Drawing Figures

HYDRAULIC BRAKING SYSTEMS

This invention relates to vehicle hydraulic braking systems, and more particularly to means for regulating the system braking pressure to a proportion of the system applied pressure in accordance with changes in the vehicle load.

It is desirable, in a vehicle braking system, to vary the maximum braking force in accordance with the vehicle load. This is especially desirable in goods vehicles, where the change in axle loads and in load distribution between axles can be considerable.

Hydraulic braking systems are known in which the braking pressure in one part of the system is limited to a pre-determined applied pressure. Other braking systems reduce the rate of increase of braking pressure, above a pre-determined applied pressure, to a fixed proportion of applied pressure. The pre-determined applied pressure may be pre-set, but is more usually variable in accordance with changes in the vehicle load. Such changes are commonly sensed by a linkage responsive to the relative distance between sprung and unsprung parts of the vehicle.

According to the invention there is provided a vehicle braking system pressure regulator through which fluid under pressure is supplied to actuate wheel brakes and which includes means to limit brake pressure to a proportion of applied pressure dependent on a variable ratio lever system whose ratio depends on the loading of the vehicle characterised thereby that said lever system comprises pivoted beam loading means, first piston means arranged to be responsive to brake pressure, acting on said loading means in opposition to second piston means arranged to be responsive to applied pressure up to a given value and to a fixed proportion of applied pressure thereafter, and valve means responsive to the angular position of said loading means to limit brake pressure.

In this specification reference to "piston means" includes references to other similar fluid pressure responsive devices, such as diaphragms.

Preferably the variable ratio lever system comprises a pivoted beam whose fulcrum position is dependent on the loading of the vehicle and which controls a brake pressure limiting valve, the effect of brake pressure being arranged to act on one arm of the beam in opposition to the effect of applied pressure arranged to act on the other arm of the beam.

Other features of the invention are included in the following description of a preferred embodiment shown by way of example, on the accompanying drawings in which.

Figure 1:
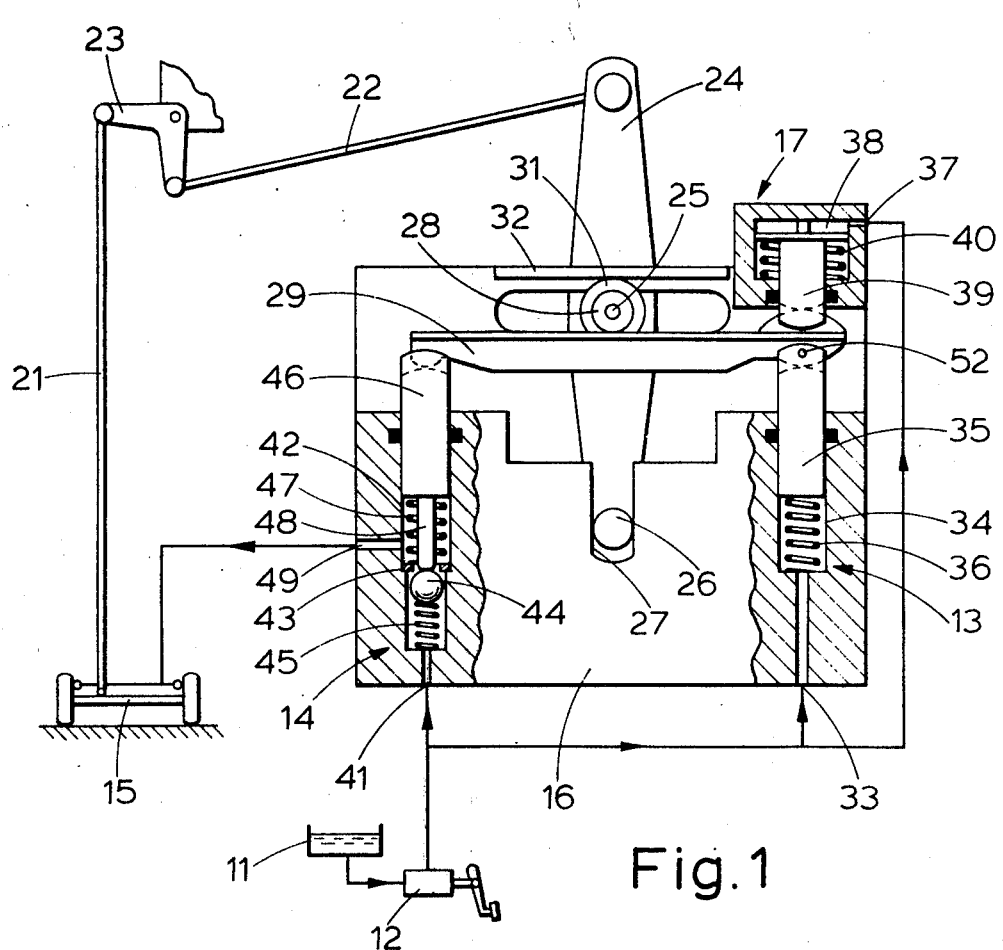
FIG. 1 is a diagrammatic representation of a load sensitive pressure regulator according to one embodiment of the invention.

In the braking system shown in FIG. 1 a hydraulic fluid reservoir 11 is connected through a driver's brake valve 12, in the form of a conventional master cylinder, to a primary loading chamber 13, a secondary loading chamber 17, and through a pressure limiting valve 14 to the brakes of a vehicle axle 15. The chambers 13, 17 and valve 14 form part of a frame 16 attached to the vehicle body which is resiliently supported on the axle 15 by any suitable means.

A vertical link 21, pivoted to the axle 15 is connected to a horizontal link 22 through a bell crank 23 mounted on the vehicle body. Link 22 is connected to one end of a vertical beam 24 which carries a pivot pin 25 near its centre. The other end of the beam 24 carries a roller 26 which engages a slot 27 in the frame 16. The slot 27 restrains the beam 24 transversely while allowing it to rock about the roller 26.

The pivot pin 25 carries two rollers. One roller 28, of smaller diameter, acts as a fulcrum for the horizontal beam 29, and the other roller 31, of larger diameter, bears against a flange 32 on the frame 16.

The loading chamber 13 has an inlet port 33 opening into the blind end of a plain bore 34 in which a piston means or plunger 35 is slidable. The plunger 35 is biased into engagement with one end of the beam 29 by a light compression spring 36.

The loading chamber 17 has an inlet port 37 opening into a stepped blind bore 38 in which a piston means or plunger 39 is slidable. The plunger 39 acts on the beam 29 in direct opposition to the plunger 35 which is of larger diameter. A pre-loaded return spring 40 acts on the plunger 39 which also serves as a stop to limit anti-clockwise rotation of the beam 29.

The limiting valve 14 has an inlet port 41 opening into the blind end of an open stepped bore 42 which has an annular seat 43 formed midway along its length. A ball 44 is urged into sealing engagement with the seat 43 by a light coiled compression spring 45 acting between the ball 44 and the blind end of the bore 42.

A piston means or plunger 46, slidable in the bore 42, is biased against the other end of the beam 29 by a light compression spring 47. The plunger 46 has an axial extension 48 which can pass through the aperture in the seat 43 to lift the ball 44 against the action of the spring 45. A brake port 49 is provided between the seat 43 and the inner face of the plunger 46 for connection to the brakes of the axle 15. Plunger 46 and the plunger 35 have the same effective area.

The horizontal beam 29 is located in a slot formed in each of the plungers 35, 39 and 46.

A rollpin 52 through one of the plungers and the adjacent end of the beam 29 restrains the beam transversely.

Figure 2:
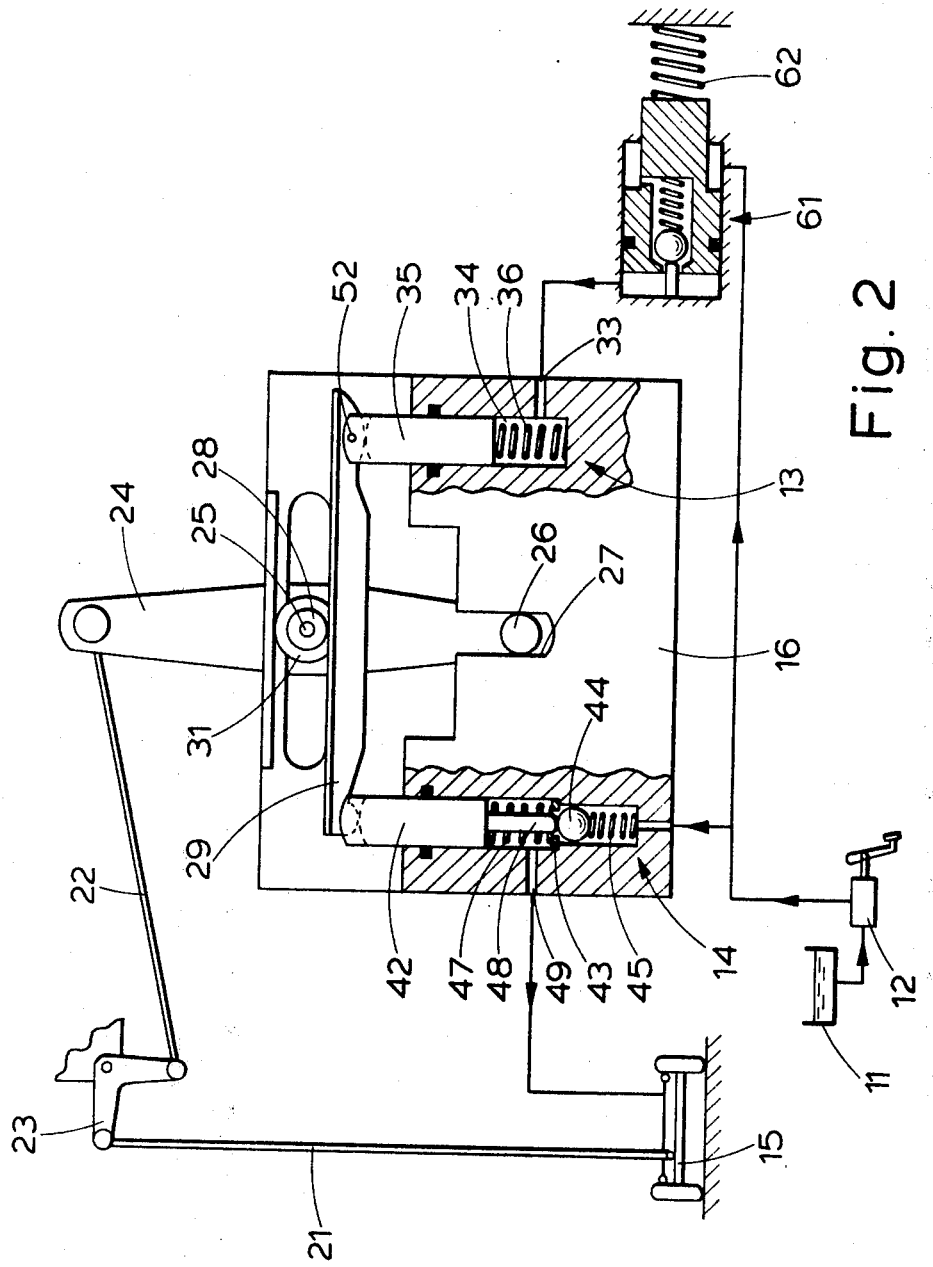
FIG. 2 is a diagrammatic representation of a load sensitive pressure regulator according to a second embodiment of the invention.

In a second embodiment of the invention, shown in FIG. 2, the loading chamber 17 is replaced by a conventional pressure proportioning valve 61 situated in the pressure supply line to the loading chamber 13. The operation of the pressure regulator, now to be described, is unchanged.

In FIGS. 1 and 2 the parts are shown in a vehicle part laden condition. Pivot pin 25 is midway between the axes of the plungers 35, 46, the beam lever ratio 'R'=1.

If the vehicle driver generates a pressure in the master cylinder 12, the applied pressure is transmitted through the limiting valve 14 to the brake of the axle 15.

At low applied pressures, and with reference to FIG. 1, the pre-load of spring 40 opposes the hydraulic force on the plunger 39, the hydraulic force on the plungers 35 and 46 exert an equal moment on the beam 29. Thus the ball 44 remains unseated and the full applied pressure is transmitted to the brakes of the axle 15.

Figure 3:
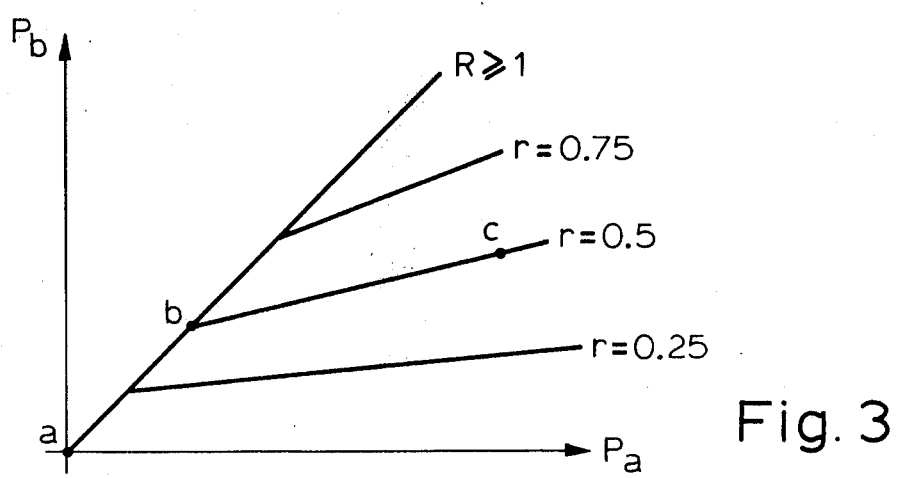
FIG. 3 is a graph of brake pressure ($P_b$) against applied pressure ($P_a$) for a given vehicle load and varying plunger area ratios.

This relationship is exemplified by portion a-b of the characteristic shown in FIG. 3 where R is the beam lever ratio; in this case R=1.

As the applied pressure increases, the resistance of spring 40 to the hydraulic force on plunger 39 is overcome, and the additional moment thus exerted about the pivot pin 25 causes the beam 29 to rotate clockwise. The ball 44 consequently seats and so prevents the pressure in the brakes of the axle 15 increasing further.

If the applied pressure increases still more the difference in effective area between the plungers 35 and 39 will result in a moment about the pivot pin 25 tending to rotate the beam 29 anti-clockwise so depressing the limiting valve plunger 46 and unseating the ball 44. The pressure in the brakes of the axle 15 will increase until the clockwise moment on the beam 29 is restored and the ball 44 is allowed to reseat.

This oscillation of the beam 29 will continue so long as the applied pressure continues to rise, allowing the axle braking pressure to increase at a proportion of the applied braking pressure.

The ratio between the effective areas of the plungers 35 and 39 is termed 'r'. For clarity of further explanation the plunger area ratio r=0,5 will be assumed, although FIG. 3 shows the effect of varying the value of 'r'. The rise of axle braking pressure while the beam 29 is oscillating is illustrated by portion b-c of FIG. 3.

Any reduction in applied pressure while the ball 44 is seated will result in an unequal hydraulic force on the ball 44 causing it to unseat and exhaust the pressure in the brakes of the axle 15.

When the master cylinder 12 is released, the beam 29 will assume the position shown in FIG. 1 as soon as the spring 40 overcomes the hydraulic force on the plunger 39, the ball 44 will be unseated and allow trapped pressure in the axle brakes to exhaust through the limiting valve 14.

Any reduction in rear axle load will cause the axle 15 to move away from the vehicle body, so rotating the vertical beam 24 clockwise about roller 26. The effective pivot point of the beam 29 will shift from a position midway along its horizontal axis to some point between that mid-position and the point of action of the plungers 35 and 39. Thus a beam lever ratio in favour of the limiting valve 14 will exist, R<1.

An increase in rear axle load will cause the axle 15 to move towards the vehicle body, so rotating the vertical beam 24 anti-clockwise about roller 26. The effective pivot point of the beam 29 will shift to some point between the beam mid position and the point of action of the plunger 46. Thus a beam lever ratio in favour of the plunger 35 will exist, R>1.

At low applied pressures, when the plunger 39 is inactive, a beam lever ratio 'R' of less than unity will result in the pressure in the brakes of the axle 15 rising as a proportion of applied pressure. For beam lever ratios greater than unity the ball 44 will be unseated and the braking pressure will be equal to the applied pressure. The effect of the beam lever ratio at low applied pressures is indicated in FIG. 4.

Figure 4:
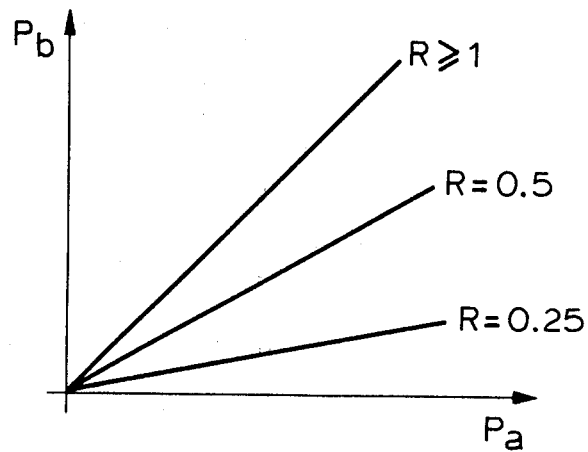
FIG. 4 is a graph of brake pressure ($P_b$) against applied pressure ($P_a$) illustrating the effect of the load dependent variable beam lever ratio.
Figure 5:
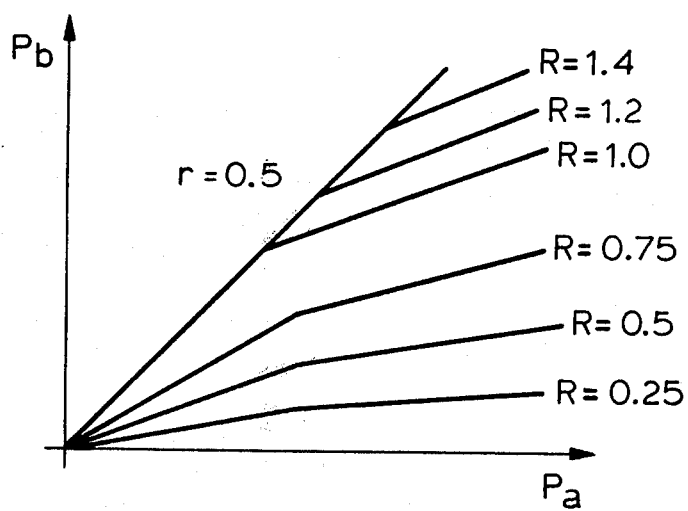
FIG. 5 is a graph of brake pressure ($P_b$) against applied pressure ($P_a$) illustrating the characteristic of the pressure regulator for varying vehicle loads.

At high braking pressures, when the plunger 39 is active, the characteristic shown in FIG. 4 is added to that shown in FIG. 3 to produce a composite characteristic, for the load sensitive valve arrangement at all applied pressures, shown in FIG. 5 for a given plunger area ratio and preload of the spring 40.

Figure 6:
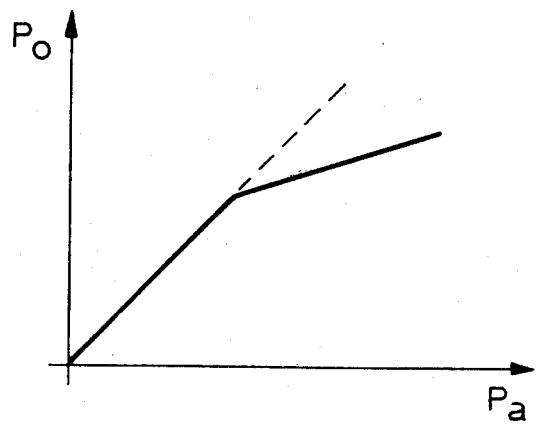
FIG. 6 is a graph of outlet pressure ($P_b$) against applied pressure ($P_a$) for a conventional pressure proportioning valve.

In the second embodiment shown in FIG. 2, where the loading chamber 17 is replaced by a conventional pressure proportioning valve 61, the applied pressure is modified by the proportioning valve, as indicated by the characteristic shown in FIG. 6. This relationship is identical to that shown in FIG. 3, the 'knee' point of the characteristic being determined by the preload of the coiled spring 62 rather than by the preload of the coiled spring 40.

Combination of the relationship shown in FIG. 6 with the unchanged beam lever characteristic, shown in FIG. 4, results in the composite characteristic shown in FIG. 5, for a given proportioning valve area ratio and preload of the spring 62.

The pre-load of the proportioning valve spring 62 may be varied in accordance with changes in the vehicle load.

Although the foregoing embodiments relate solely to hydraulic braking systems it will be realised that the principle of operation can be extended to air braking systems.

I claim:

1. A vehicle braking system pressure regulator through which fluid under pressure is supplied to actuate wheel brakes and which includes means to limit brake pressure to a proportion of applied pressure dependent on the vehicle loading, said regulator comprising:

a housing;
   a beam member pivotally located in said housing;
   first piston means located in the housing to act on the beam member and to subject said beam member to the effect of brake pressure;
   second piston means located in the housing to act on the beam member and to subject said beam member to the effect of applied pressure up to a given value and to a fixed proportion of applied pressure thereafter;
   a fulcrum member supported by said housing and providing a fulcrum for said beam member intermediate said first and second piston means, means being provided for the position of said fulcrum to be dependent on vehicle loading;
   and valve means responsive to the angular position of said beam member to control fluid pressure in the regulator to control brake pressure.

2. A pressure regulator according to claim 1, wherein said valve means are operable through said first piston means.

3. A pressure regulator according to claim 1, wherein said second piston means comprise:

a first plunger to be responsive to applied pressure and arranged to act on one moment arm of said beam member;
   a second plunger, of smaller effective area than said first plunger, to be responsive to applied pressure and arranged to act on said one moment arm in opposition to said first plunger and pre-loaded resilient means arranged to act in opposition to said second plunger.

4. A pressure regulator according to claim 3, wherein said first piston means comprise a brake plunger to be responsive to brake pressure, said plunger being of the same effective area as said first plunger.

5. A pressure regulator according to claim 3, wherein said resilient means comprise a coiled compression spring co-axial about said second plunger.

6. A pressure regulator according to claim 1, wherein said second piston means comprise a regulator plunger responsive to fluid pressure and arranged to act on said beam, and a pressure reducing valve, said valve comprising:
- a body with a bore therein;
- a differential area piston slidable in said bore;
- a fluid pressure inlet open to one side of said piston;
- a fluid pressure outlet open to the opposite side of said piston;
- pre-loaded resilient means acting on said piston;
- and valve means responsive to the position of said piston to limit fluid pressure at said outlet port to a fixed proportion of fluid pressure at said inlet port above a given fluid pressure dependent on the pre-load of said resilient means, and applied pressure acting at said inlet port, said regulator plunger being responsive to fluid pressure at said outlet port.

7. A pressure regulator according to claim 6, wherein said first piston means comprise a brake plunger to be responsive to brake pressure, said brake plunger and said regulator plunger having the same effective area.

* * * * *